US008416453B2

(12) United States Patent
Stevens et al.

(10) Patent No.: US 8,416,453 B2
(45) Date of Patent: Apr. 9, 2013

(54) SELECTING BLENDED REGIONS OF COLOR SPACE

(75) Inventors: Michael Thomas Stevens, Aloha, OR (US); Kenneth Carlton Peterson, Tigard, OR (US)

(73) Assignee: Xerox Corporation, Norwalk, CT (US)

( * ) Notice: Subject to any disclaimer, the term of this patent is extended or adjusted under 35 U.S.C. 154(b) by 660 days.

(21) Appl. No.: 12/627,477

(22) Filed: Nov. 30, 2009

(65) Prior Publication Data

US 2011/0128558 A1 Jun. 2, 2011

(51) Int. Cl.
*G06F 15/00* (2006.01)

(52) U.S. Cl. .......................... 358/1.9; 358/500; 358/540

(58) Field of Classification Search ................ 358/1.9
See application file for complete search history.

(56) References Cited

U.S. PATENT DOCUMENTS

| 2006/0176375 A1* | 8/2006 | Hwang et al. ............... 348/222.1 |
| 2008/0007749 A1* | 1/2008 | Woolfe ........................... 358/1.9 |
| 2009/0073465 A1 | 3/2009 | Rolleston et al. |

OTHER PUBLICATIONS

Woolfe Natural Language Color Editing, Xerox Innovation Group, Inter-Society Color Council, Apr. 29, 2007, Webster, NY.

* cited by examiner

*Primary Examiner* — Marivelisse Santiago Cordero
*Assistant Examiner* — Moustapha Diaby
(74) *Attorney, Agent, or Firm* — Pillsbury Winthrop Shaw Pittman, LLP

(57) ABSTRACT

A method for adjusting the color of an image is provided. The image includes a plurality of pixels. The method includes receiving a natural language command to adjust a selected color of at least a portion of the image; determining a selection value for a pixel of interest by comparing a location of a color of the pixel of interest within a color space to a plurality of planes defining a multi-dimensional boundary of a portion of the color space corresponding to the selected color; and adjusting, based on the natural language command, the selected color of the pixel or the pixels of at least the portion of the image determined to be within the portion of the color space corresponding to the selected color. The selection value is representative of whether the pixel of interest lies within the portion of the color space corresponding to the selected color.

10 Claims, 4 Drawing Sheets

SELECTING BLENDED REGIONS OF COLOR SPACE

BACKGROUND

1. Field

The present disclosure generally relates to a method and a system for adjusting the color of a rendered image.

2. Description of Related Art

Color Management is a technology aimed at getting the right color. Most of today's systems use something akin to the ICC (International Color Consortium) model of having color management profiles for each device and color encoding within a system. The ICC model also allows for the inclusion of abstract profiles that implement color preferences but do not model actual devices. The imaging chain is accomplished by linking a number of these profiles together, and processing data through the linked profiles.

Many color devices allow the user to control which color profiles are used in the imaging chain. The user selects the color profile or a device may come with a preset profile. Even where the user selects the color profile, devices are usually shipped with a default color profile setting. If the current profile does not suit the user's needs (for example, if the user wants the reds darker or the greens slightly bluer), there is currently only a trial-and-error methodology for choosing different profiles (or in general, any color rendering options). This trial and error methodology is often implemented by making changes and then creating a test print under the modified conditions. This trial and error process is often repeated multiple times until pleasing or acceptable results are obtained.

There are many ways to specify color and color difference. Color imaging scientists and engineers often use precise, numeric color specifications based on standardized color spaces and color encodings. Such color specifications are often based on the color matching behavior of a standard human observer. Color matching behavior has been embodied in the CIEXYZ system of colorimetry, for example. Other related systems based on the color matching behavior of a standard human observer include the widely used CIELab or the less common CIELuv system. These color specifications are commonly called device-independent color encodings. Color imaging scientists and engineers also use device-dependent color specifications in which colors can be precisely specified in terms of the color characteristics of a particular device. These color characteristics include the white point and color primaries (or colorants) of the device as well as an appropriate color mixing model. Colors are also specified using color order systems such as the Munsell Book of Color, the Swedish Natural Color System, or the Pantone Color Formula Guide. These systems of color specifications are also precise, but are more commonly used by professionals in the color graphics and design industries rather than color imaging.

Another, more common form of specifying color is to use color names in natural language. As the term suggests, natural language refers to the use of everyday terminology, rather than precise mathematical or technical definitions. Although natural language is a far less precise method of color specification than those discussed above, it is nonetheless the most widely used and best understood method of color specification used by consumers of color. This method of color specification uses common color names, such as red, green, blue, etc. It also uses combinations of common color names to refine the specification. Examples of such combinations include reddish-brown, greenish-blue, yellowish-green etc.

In addition, natural language provides many modifying adjectives to provide further subtle discrimination in color specification. Examples of such modifying adjectives include light, dark, bright, saturated, vivid, muddy, moderate, dull, pale, washed-out, more/less of a color, etc.

Natural color languages use other words and phrases for specifying colors and color differences, which may not be as precisely defined as other color specification methods. Examples of these words and phrases include "slightly less yellow", "much darker", "more saturated", "greener", "significantly punchier", and "a smidge lighter". Now, while these expressions are certainly imprecise, many people commonly use them to describe how they would like their printed material to be changed to meet their requirements. However, color management systems that allow a user to modify an input color or set of input colors generally do not use natural language inputs and require the user to develop an understanding of the behavior of the various controls provided in the user interface of such systems. Such systems are therefore difficult to use for many people.

A color management system could use semantic color adjustments, such as "brighter", "darker", "vivid" etc., which are more readily understood by users than technical implementations (e.g., TRC curves with specified gamma). In other words, the user does not need to understand the implementation; they only need to know the resulting effect, in a language they can appreciate. There are generally no such semantic definitions associated with more complex color transforms such as the 3D or 4D color look-up-tables, which are part of an ICC profile. It may be that the file names, a private tag, or perhaps a comment field within the profile could contain such information, but this is ad hoc.

A natural language interface would be an advantage to most users of color imaging devices. Since both color professionals and consumers of color use and understand the natural language of color, it is a natural choice as a simple-to-use method for color device control software. While verbal descriptions of color and color differences are less precise than the numerical specification of color spaces, they provide better understood communication system and may be preferable to a highly precise but less intelligible interface.

Developing a useful mapping between natural language color specifications and the precise numerical color encodings used in color image processing and device control applications is not simple. An exemplary method for mapping between natural language instructions and actions in a color space was previously disclosed in U.S. patent application Ser. No. 11/479,484, "Natural Language Color Communication and System Interface," the disclosure of which is incorporated by reference herein.

The Natural Language Color Editing scheme typically uses kd trees, which is a space-partitioning data structure for organizing points in a k-dimensional space. The memory foot print of this implementation (i.e., the Natural Language Color Editing scheme that uses kd trees) is very large may cause resource allocation failures if adequate memory is not provided, which increases device costs. However, even with adequate memory the performance may be slow because the process is computationally intensive. Therefore, there is a need for a Natural Language Color Editing scheme that provides both a smaller memory footprint and a faster execution time.

SUMMARY

According to one aspect of the present disclosure, a method for adjusting the color of an image is provided. The image includes a plurality of pixels. The method includes receiving a natural language command to adjust a selected color of at least a portion of the image; determining a selection value for a pixel of interest in the image by comparing a location of a color of the pixel of interest within a color space to a plurality of planes defining a multi-dimensional boundary of a portion of the color space corresponding to the selected color; and adjusting, based on the natural language command, the selected color of the pixel or the pixels of at least the portion of the image determined to be within the portion of the color space corresponding to the selected color. The selection value is representative of whether the pixel of interest lies within the portion of the color space corresponding to the selected color.

According to another aspect of the present disclosure, a system for adjusting the color of an image is provided. The image includes a plurality of pixels. The system includes an user interface, and a processor. The processor is configured to a) to receive a natural language command from the user interface to adjust a selected color of at least a portion of the image; b) to determine a selection value for a pixel of interest in the image by comparing a location of a color of the pixel of interest within a color space to a plurality of planes defining a multi-dimensional boundary of a portion of the color space corresponding to the selected color; and c) to adjust, based on the natural language command, the selected color of the pixel or the pixels of at least the portion of the image determined to be within the portion of the color space corresponding to the selected color. The selection value is representative of whether the pixel of interest lies within the portion of the color space corresponding to the selected color.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure provides a method for selecting regions of the color space. The method provided in the present disclosure is used in the Natural Language Color Editing scheme. The method of the present disclosure, starts with a large piece (or chunk) of the color space, and then uses a set of dot products to cleave off big sections of the color space leaving the desired section of the color space. The method of the present disclosure also proposes blending the boundaries of the selected regions with the non-selected regions.

The method, in particular, uses a plurality of planes for selecting regions of the color space, and calculates on which side of each plane a pixel of interest lies. The method determines a selection value for the pixel of interest, where the selection value is representative of whether the pixel of interest within the color space is selected, unselected, or a blended value. For any given pixel of interest, a selection value s is determined such that: $0 \leq s \leq 1$. A value of s=0 means that the point within the space is totally unselected. A value of s=1 means that the point within the space is totally selected. Intermediate values of s represent blended values.

In one embodiment, the method of the present disclosure proposes determining a selection value for a pixel of interest for a convex hull (i.e., with a plurality of planes) in which the method uses a pair of vectors to define a plane in the convex hull, uses dot product calculations to determine a sub-selection value for the pixel of interest for each plane in the convex hull, and assigns the selection value for the pixel of interest with respect to the convex hull as the minimum sub-selection values for the pixel of interest with respect to the planes in the convex hull.

In another embodiment, the present disclosure proposes determining a selection value for a pixel of interest for volumes with concave surfaces in which the method excludes concave surfaces from the base convex hull by setting the selection value for the pixel of interest as the minimum of selection value for the pixel of interest with respect to the base convex hull and 1−s, where s is the selection value for the pixel of interest with respect to the $k^{th}$ convex hull to be excluded.

Figure 1:
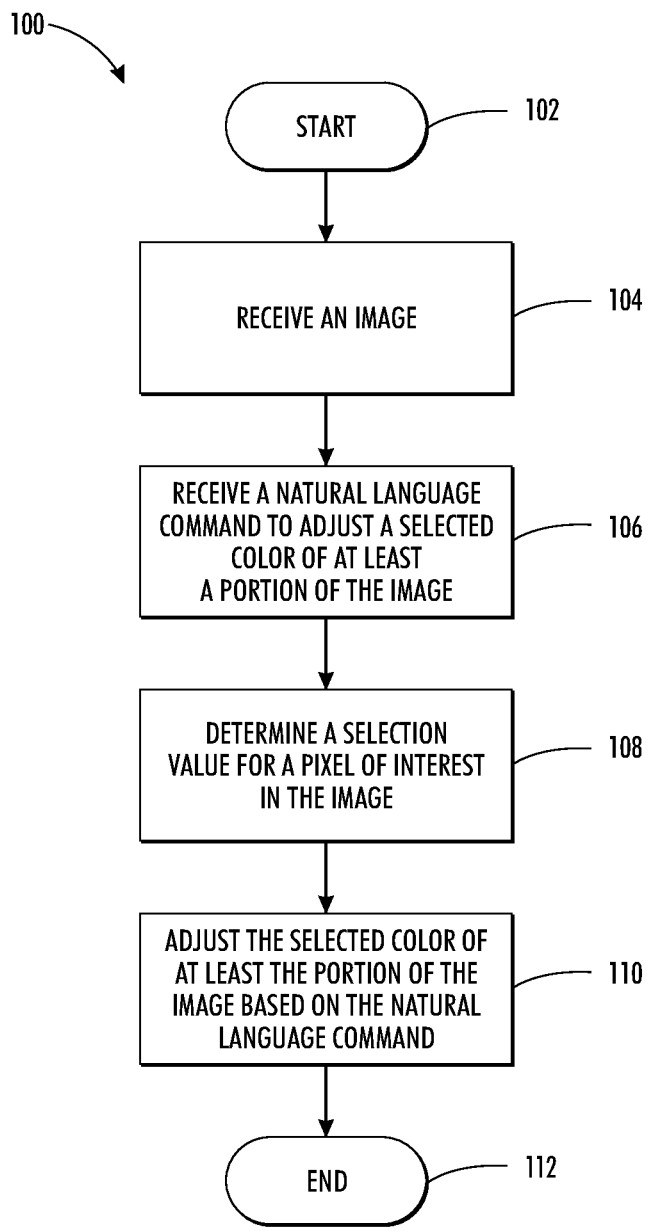
FIG. 1 shows a method for adjusting the color of an image according to an embodiment of the present disclosure.

FIG. 1 shows a method 100 for adjusting the color of an image. The method 100 begins at procedure 102. At procedure 104, an image printing system is configured to receive an image from a user. The image comprises a plurality of pixels. The user may send the image to the image printing system by, for example, by scanning the image at the image printing system or electronically sending the image to the image printing system.

An image viewing unit may optionally then generate an output copy of the image. The user may review this output copy of the image and if the colors were unsatisfactory, the user may then enter any desired changes to the output. These changes may be received by a processor of the image printing system in a natural language description. In one embodiment, a lexicon may be available to the user so that the user may tailor his/her request to terms that the image printing system will "understand." Otherwise, the image printing system may simply parse and/or interpret the user's request, and issue an error or other message if the image printing system does not understand the request. At procedure 106, a natural language command to adjust a selected color of at least a portion of the image is received by the processor of the image printing system. The selected color is dictated by the natural language input (e.g., if the input is to make red darker, the process would function to modify qualifying red pixels).

Based upon the desired changes received by the processor, the processor, at procedure 108, is configured to determined a selection value for a pixel of interest in the image by comparing a location of a color of the pixel of interest within a color space to a plurality of planes defining a multi-dimensional boundary of a portion of the color space corresponding to the selected color. That is, the processor examines each pixel individually to determine its selection value by this procedure. For example, if the selected color is red, it compares the location of each pixel to the planes defining the boundary of the color space portion corresponding to red. The selection value is representative of whether the pixel of interest lies within the portion of the color space corresponding to the selected color.

In one embodiment, the selection value for the pixel of interest in the image is determined by determining a sub-selection value for the pixel of interest with respect to each plane in the color space; determining a minimum value of the sub-selection values; and assigning the determined minimum value as the selection value for the pixel of interest. In other words, the minimum sub-selection value is the selection value of the pixel of interest for that color space region.

Figure 2:
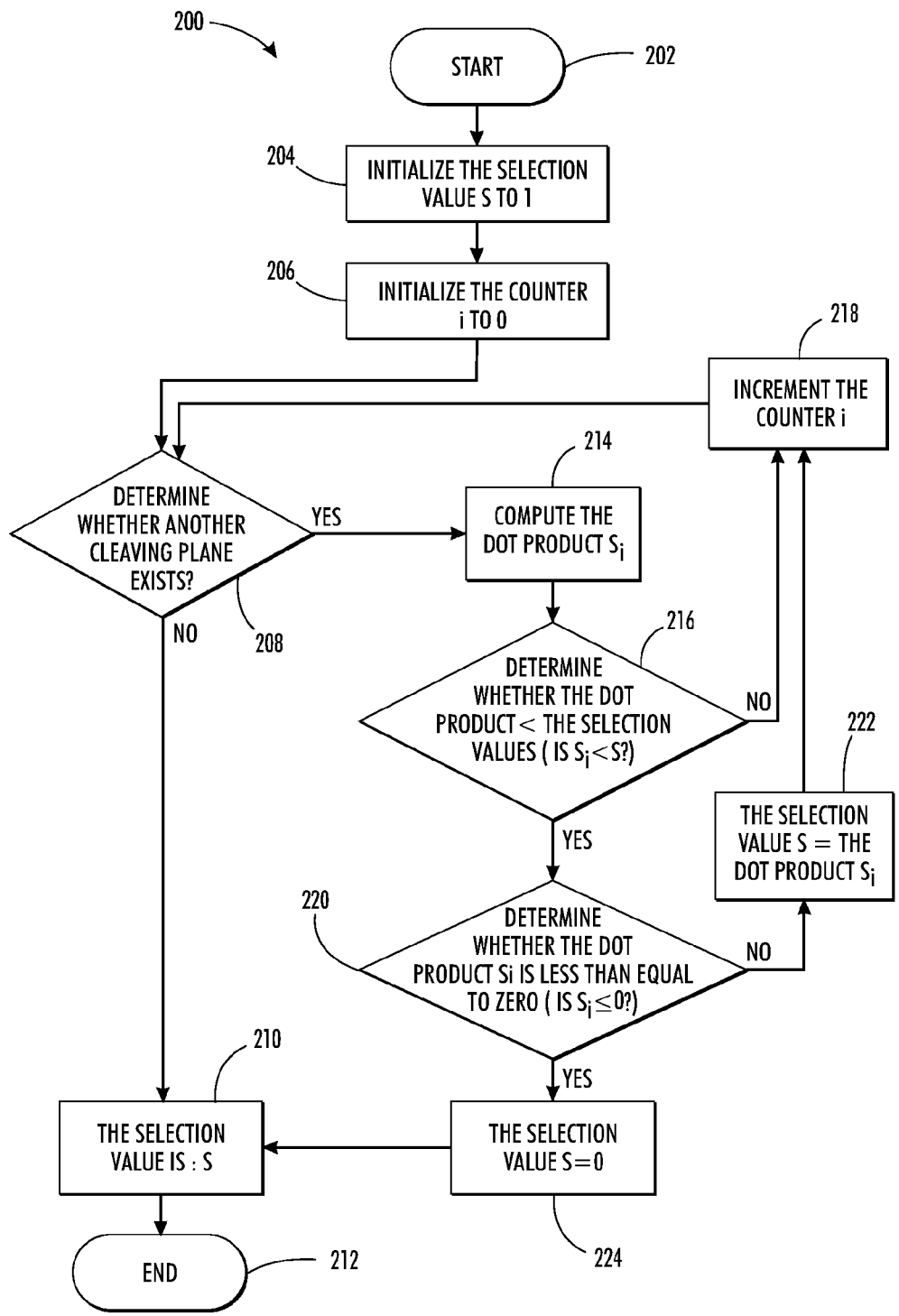
FIG. 2 shows a method for adjusting the color of an image, wherein the method is used for selecting convex hulls according to an embodiment of the present disclosure.

For convex hulls, the selection value for the pixel of interest in the image may be determined by determining a sub-selection value for the pixel of interest with respect to each plane in the color space; determining a minimum value of the sub-selection values and the value of 1; determining a maximum value of the determined minimum value and the value of 0; and assigning the determined maximum value as the selection value for the pixel of interest. In other words, either zero or the maximum of the minimum sub-selection values (or one if they exceed one) is the selection value of the pixel of interest for that color space region. FIG. 2 describes a method 200 that is used to determine the selection value for the pixel of interest in the image for convex hulls.

For example, a convex hull or an open convex hull bounding a color space region may include N planes. In such an embodiment, each plane includes a sub-selection value $s_i$ for the pixel of interest, where i represents the plane i of the convex hull. The selection value s for the pixel of interest with respect to a convex hull or an open convex hull that includes N planes may be computed using the following equation:

$$s = \text{MAX}(0, \text{MIN}(1, s_1, s_2, \ldots, s_N)) \quad \text{Equation (1)}$$

where

N is the number of planes in the convex hull;

s is the selection value for the pixel of interest with respect to the convex hull;

$s_1$ is the sub-selection value for the pixel of interest with respect to the plane 1 of the convex hull;

$s_2$ is the sub-selection value for the pixel of interest with respect to the plane 2 of the convex hull;

. . .

$s_N$ is the sub-selection value for the pixel of interest with respect to the plane N of the convex hull; and MAX( ) represents the maximum function; and MIN( ) represents the minimum function.

In general, a convex hull by definition is not allowed to have concave surfaces. It is possible to subdivide any volume into a set of convex hulls. The selection value for pixel of interest with respect to each convex hull is computed, and the largest value of the set is the selection value of the complex volume. However, it is more efficient to select a larger convex hull, then exclude the portions of the larger hull bounded by the concave surfaces.

Figure 3:
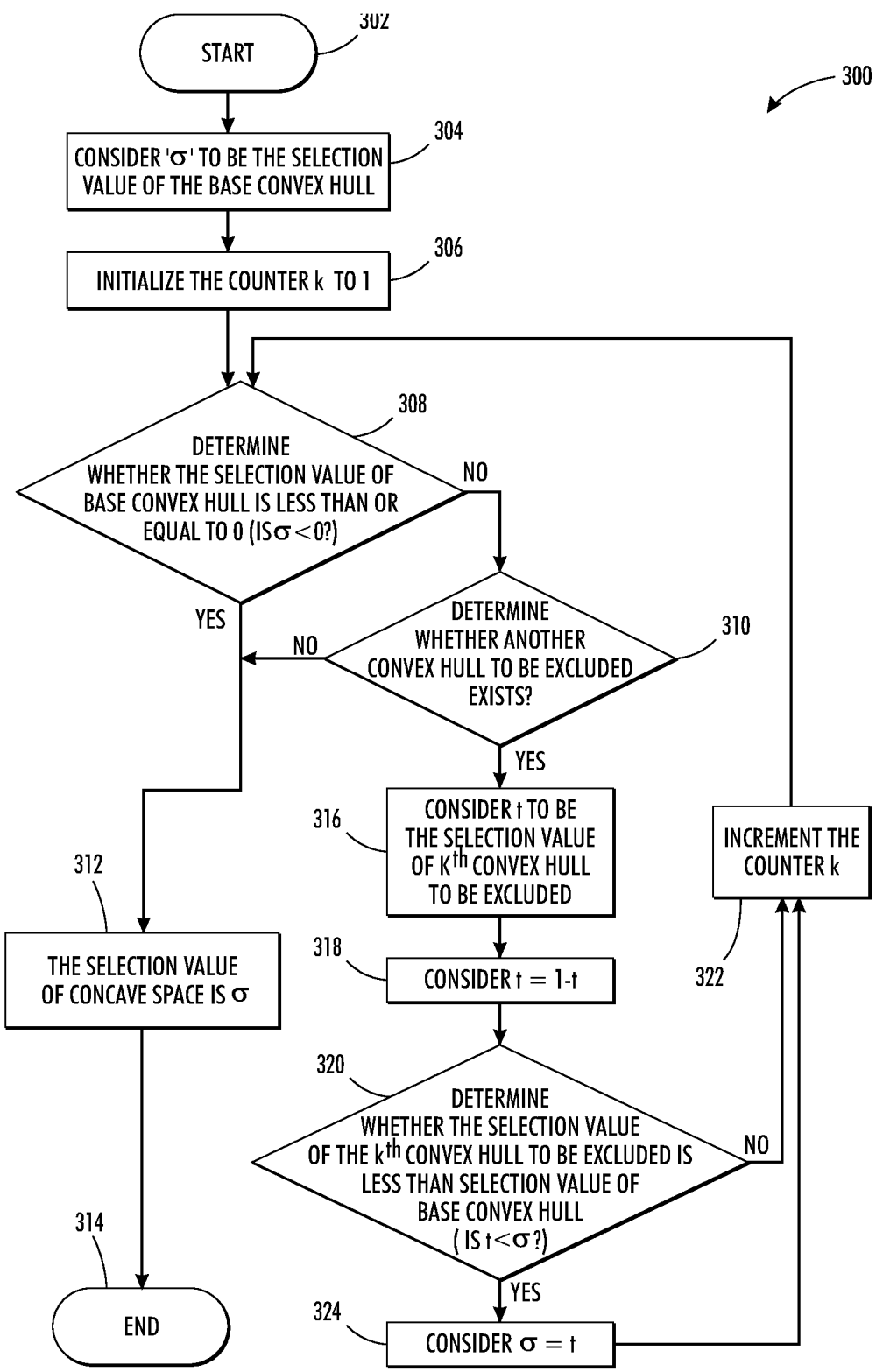
FIG. 3 shows a method for adjusting the color of an image, wherein the method is used for selecting volumes with concave surfaces according to an embodiment of the present disclosure.

Therefore, for a color space region with concave surfaces, the selection value for the pixel of interest in the image is determined by providing a base convex hull and one or more excluded convex hulls defined by concave planes and one or more planes of the base convex hull, wherein the excluded convex hulls are to be excluded from the base convex hull. That is, the base convex hull includes all the convex planes/hulls of the color space region, and one or more convex planes bounding the excluded convex hulls; the excluded convex hulls are the spaces between the concave planes and the base convex hull. A base selection value is determined for a pixel of interest with respect to the base convex hull. A sub-selection value is determined for the pixel of interest with respect to each convex hull to be excluded. A difference is determined, for each convex hull to be excluded, between the value of 1 and the sub-selection value for the pixel of interest with respect to each excluded convex hull. A minimum value of the base selection value for pixel of interest with respect to the base convex hull, and the determined differences is also determined. The determined minimum value is then assigned as the selection value for the pixel of interest. In other words, if the pixel of interest is determined to be inside the base convex hull, but not in the excluded hull(s), it will be assigned a value representing its location in the color space region having the complex shape; but if it is determined to be both in the base hull and an excluded hull, it will be assigned a value excluding it from the color space region. FIG. 3 describes a method 300 that is used to determine the selection value for the pixel of interest in the image for volumes with concave surfaces.

For example, the selection value for the pixel of interest with respect to a base convex hull or an open convex hull is determined to be equal to $\sigma_0$. In one embodiment, the selection value $\sigma_0$ for the pixel of interest with respect to a base convex hull or an open convex hull is determined using Equation (1). If there are K convex hulls/open convex hulls to be excluded. The selection value s for the pixel of interest for a volume with concave surfaces that includes K convex hulls/open convex hulls to be excluded may be computed using the following equation:

$$s = \text{MIN}(\sigma_0, 1-\sigma_1, 1-\sigma_2, \ldots, 1-\sigma_K) \quad \text{Equation (2)}$$

where for all integers k such that $1 \leq k \leq K$ $\sigma_0$ is the selection value for the pixel of interest with respect to the base convex hull or open convex hull;

$\sigma_1$ is the selection value for the pixel of interest with respect to the $1^{st}$ convex hull or open convex hull to be excluded;

$\sigma_2$ is the selection value for the pixel of interest with respect to the $2^{nd}$ convex hull or open convex hull to be excluded;

. . .

$\sigma_k$ is the selection value for the pixel of interest with respect to the $k^{th}$ convex hull or open convex hull to be excluded;

s is the selection value for the pixel of interest with respect to the concave hull; and MIN( ) represents the minimum function.

For any given pixel of interest, a selection value s for the pixel of interest is determined such that: $0 \leq s \leq 1$. If the selection value for the pixel of interest in the image is equal to a value of 1, then the pixel of interest lies within the portion of the color space corresponding to the selected color. If the selection value for the pixel of interest in the image is equal to a value of 0, then the pixel of interest lies outside the portion of the color space corresponding to the selected color. If the selection value for the pixel of interest in the image is between the value of zero and the value of one, then the pixel of interest lies on edge regions (or shadow regions) of the portion of the color space corresponding to the selected color.

Based on the selection value, if it is determined that the pixel of interest lies within the portion of the color space corresponding to the selected color, the method 100 then proceeds to procedure 110. At procedure 110, the processor is configured to adjust the selected color of at least the portion of the image based on the natural language command. The method 100 ends at procedure 112.

If the user requests a natural language command, for example, "blues be lighter", then the method 100 is configured to determine a selection value, which is representative of whether a pixel of interest lies within the portion of the color space corresponding to the blue color. If the selection value for the pixel of interest in the image is equal to a value of 1, then the pixel of interest lies within the portion of the color space corresponding to the blue color. The method 100 then is configured to adjust the blue color of at least the portion of the image based on the natural language command (i.e., "blues be lighter" or to make blues lighter). The image output device may generate an output copy of the document after making the adjustment of the blue color of at least the portion of the image based on the natural language command. The output copy may, for example, be present on a display or a hardcopy output from the image printing system.

The color space may generally include a L*a*b* color space, a CMY color space, a CMYK color space, or a RGB color space. The L*a*b* color space is a device independent color spaces, while the RGB color space (i.e., three-dimensional color space), the CMY color space (i.e., three-dimensional color space), and the CMYK color space (i.e., four-dimensional color space) are device dependent color spaces.

FIG. 2 shows the method 200 for adjusting the color of an image, wherein the method 200 is used for selecting convex hulls according to an embodiment of the present disclosure. The method 200 determines a selection value for pixel of interest with respect to a convex hull (i.e., with a plurality of planes) in which the method 200 uses a pair of vectors to specify a plane in the convex hull, uses dot product calculations to determine a sub-selection value for the pixel of interest for each plane in the convex hull, and assigns the selection value in the convex hull as the minimum sub-selection values of the planes in the convex hull.

The method 200 begins at procedure 202. At procedure 204, the method 200 is configured to initialize the selection value s. In one embodiment, the selection value s is initialized to a value equal to a value of one. The method 200 at procedure 206 is configured to initialize a counter i. In one embodiment, the counter i is initialized to a value equal to a value of zero.

After initializing the counter i and the selection value s, the method 200 proceeds to procedure 208. At procedure 208, method 200 is configured to determine whether another cleaving plane exists. If it is determined that another cleaving plane exists, then the method 200 proceeds to procedure 214. If not, the method 200 proceeds to procedure 210.

At procedure 214, the method 200 is configured to compute a dot product $s_i$. The dot product $s_i$ is calculated as described below. In one embodiment, two vectors are used to define a plane i in the convex hull. The first vector is generally referred to as an offset or a boundary vector $\vec{p}_i$. The boundary or the offset vector generally specifies a point through which boundary of the plane passes.

$$\vec{p}_i \equiv \begin{bmatrix} p_{ix} \\ p_{iy} \end{bmatrix} \quad \text{Equation (3)}$$

where i represents the plane i of the convex hull;
$\vec{p}_i$ is the offset vector for plane i of the convex hull, where the offset vector is a point on the boundary s=0 and s>0;
$p_{ix}$ is the x component of the offset vector (or the component of offset vector along x direction); and
$p_{iy}$ is the y component of the offset vector (or the component of offset vector along y direction).

The second vector is generally referred to an orthogonal or a normal vector $\vec{n}_i$. The orthogonal or the normal vector generally specifies a direction orthogonal to the boundary of the plane.

$$\vec{n}_i \equiv \begin{bmatrix} n_{ix} \\ n_{iy} \end{bmatrix} \quad \text{Equation (4)}$$

where i represents the plane i of the convex hull;
$\vec{n}_i$ is the normal vector for the plane i of the convex hull, where the normal vector is orthogonal to the boundary s=0 and s>0;
$n_{ix}$ is the x component of the normal vector (or the component of normal vector along x direction); and
$n_{iy}$ is the y component of the normal vector (or the component of normal vector along y direction).

In one embodiment, the blend distance $d_i$ (i.e., the width of the blending region) is determined by the normal vector using the following equation:

$$d_i = \frac{1}{\|\vec{n}_i\|} \quad \text{Equation (5)}$$

where i represents the plane i of the convex hull;
$d_i$ is the blend distance for the plane i of the convex hull; and
$\|\vec{n}_i\|$ is the magnitude of the normal vector for the plane i of the convex hull.

Therefore, the length of the normal vector defining each plane is used to indicate the blending distance in that direction.

The sub-selection value for the pixel of interest with respect to the plane i of the convex hull is computed using the dot product. The sub-selection value for pixel of interest with respect to each plane in the convex hull is determined by computing the dot product of a difference between a pixel of interest and the boundary vector, and the normal vector. The dot product is computed using the following equation:

$$s_i = (\vec{q} - \vec{p}_i) \cdot \vec{n}_i \quad \text{Equation (6)}$$

where i represents the plane i of the convex hull;
$\vec{p}$ is the pixel of interest;
$s_i$ is the sub-selection value for the pixel of interest with respect to the plane i of the convex hull;
$\vec{p}_i$ is the offset vector for plane i of the convex hull; and
$\vec{n}_i$ the orthogonal vector for plane i of the convex hull.

The dot product computed in equation (6) may be expressed as $$s_i = \sum_{j=1}^{2} (q_j - p_{ij}) n_{ij} \quad \text{Equation (6a)}$$

where j represents the dimensions of the vector pairs $\vec{p}_i$ and $\vec{n}_i$.

Even though the vector pairs $\vec{p}_i$ and $\vec{n}_i$ shown in Equations (3), (4) and (6a) are defined in a two-dimensional space, it is contemplated that the vector pairs $\vec{p}_i$ and $\vec{n}_i$ may be extended to a multi-dimensional space. When the vector pairs $\vec{p}_i$ and $\vec{n}_i$ are extended to the multi-dimensional space, the value of j in Equation (6a) ranges from 0 to N, where N is the $N^{th}$ dimension in the multi-dimensional space.

In general, the selection value for the pixel of interest with respect to the plane i of the convex hull $s_i$ is not limited to the range $0 \leq s \leq 1$. However, in order to be interpreted as a sub-selection value, the method 200 limits/bounds $s_i$ to the range $0 \leq s_i \leq 1$. As noted above, for any given pixel of interest, a sub-selection value $s_i$ is determined such that: $0 \leq s_i \leq 1$. A value of $s_i = 0$ means that the point within the space is totally unselected. A value of $s_i = 1$ means that the point within the space is totally selected. Intermediate values of $s_i$ represent blended values.

At procedure 216, the method 200 is configured to determine whether the value of the dot product $s_i$ is less than the selection value s for the pixel of interest. In other words, at procedure 216, it is determined whether the computed dot product is a minimum value. If it is determined that the dot product $s_i$ is less than the selection value s, the method 200 proceeds to procedure 220. If not, the method 200 proceeds to procedure 218.

At procedure 218, the value of the counter i is incremented. In one embodiment, the value of the counter i is incremented by a value of one. The method 200 from procedure 218 returns to procedure 208 to determine whether another cleaving plane exists.

At procedure 220, the method 200 is configured to determine whether the value of the dot product $s_i$ is less than a lower limit. In one embodiment, the lower limit is equal to a value of zero. The method 200 at procedure 220 determines if the new value of the dot product is lower than the lower limit. If it is determined that the value of the dot product $s_i$ is less than a lower limit (i.e., the value of zero), then method 200 proceeds to procedure 224 where the value of zero is considered the selection value s, and the method 200 then proceeds to procedure 210. Because of the way dot products are calculated, a negative value indicates that the pixel of interest is on the side of the plane facing away from the bounded color space region, thus indicating that it is outside the region. If not (i.e., the value of $s_i$ is not less than a lower limit), the method 200 proceeds to procedure 222.

At procedure 222, the value of the dot product $s_i$ is considered the selection value s. The method then proceeds to procedure 218, where the counter i is incremented.

At procedure 210, the selection value s is considered the selection value of the convex hull, and the method 200 ends at procedure 212.

An exemplary subroutine that is configured to select skin-tone colors from the RGB color space is given below. This subroutine is configured to select a region of a color space, for example, by slicing the RGB cube with three planes.

```
void cp_nl_rgb_color_skintone_colors (float r   UNUSED,
                                      float g   UNUSED,
                                      float b   UNUSED,
                                      float *sel UNUSED)
{
float s UNUSED;
float temp UNUSED;
s = 1.0;
/* blend distance = 0.10000 */
temp = /* + ((r  - (  0.00000)  )   * (   0.00000)  ) */
       + ((g  - ( -0.14142)  )   * (   7.07107)  )
       + ((b /* - (  0.00000) */)  * (  -7.07107)  );
if(temp<s) { s=temp; if(s<=0.0) { *sel=0.0; return; } }
/* blend distance = 0.10000 */
temp = + ((r /* - (  0.00000) */)  * (   5.88348)  )
       + ((g - ( -0.02252)  )   * (  -7.84465)  )
       + ((b /* - (  0.00000) */)  * (   1.96116)  );
if(temp<s) { s=temp; if(s<=0.0) { *sel=0.0; return; } }
/* blend distance = 0.10000 */
temp =   + ((r  - (  0.62797)  )   * (  -7.81404)  )
       + ((g /* - (  0.00000) */)  * (   2.79073)  )
       + ((b /* - (  0.00000) */)  * (   5.58146)  );
if(temp<s) { s=temp; if(s<=0.0) { *sel=0.0; return; } }
   *sel=s; return;
}
```

For any given R, G, and B values (i.e., "r," "g," and "b" variables in the above subroutine), the exemplary subroutine is configured to return a selection value (i.e., "*sel" variable in the above subroutine). As noted above, the selection value generally ranges between 0 and 1. In the above exemplary subroutine, if the subroutines returns a *sel of 1, then the pixel of interest lies within the portion of the color space corresponding to the skin tone color. If the subroutines returns a *sel of 0, then the pixel of interest lies outside the portion of the color space corresponding to the skin tone color. If the subroutines returns a *sel between 0 and 1 (i.e., but not 0 or 1), then the pixel of interest lies on edge regions (or shadow regions) of the portion of the color space corresponding to the skin tone color.

FIG. 3 shows the method 300 for adjusting the color of an image, wherein the method 300 is used for selecting volumes with concave surfaces according to an embodiment of the present disclosure. The selection value for the pixel of interest in the image is determined by providing a base convex hull and a plurality of convex hulls, wherein the convex hulls are configured to be excluded from the base convex hull; determining a base selection value for the pixel of interest with respect to the base convex hull; determining a sub-selection value for the pixel of interest with respect to each convex hull to be excluded; determining a difference, for each convex hull to be excluded, between the value of 1 and the sub-selection value for the pixel of interest with respect to each convex hull; determining a minimum value of the base selection value for the pixel of interest with respect to the base convex hull, and the determined differences; and assigning the determined minimum value as the selection value for the pixel of interest.

The method 300 begins at procedure 302. At procedure 304, a is considered the selection value for the pixel of interest with respect to the base convex hull. The method 300 at procedure 306 is configured to initialize a counter k. In one embodiment, the counter k is initialized to a value equal to a value of one.

After initializing the counter k, the method 300 proceeds to procedure 308. At procedure 308, the method 300 is configured to determine whether the selection value for the pixel of interest with respect to the base convex hull σ is less than or equal to the value of zero. If it is determined that the selection value for the pixel of interest with respect to the base convex hull σ is less than or equal to the value of zero, the method 300 proceeds to procedure 312. If not, the method 300 proceeds to procedure 310.

At procedure 310, the method 300 is configured to determine whether another convex hull that is to be excluded from the base convex hull exists. If it is determined that another convex hull that is to be excluded from the base convex hull exists, the method 300 proceeds to procedure 316. If not, the method 300 proceeds to procedure 312.

At procedure 316, t is considered the selection value for the pixel of interest with respect to the $k^{th}$ convex hull or open convex hull to be excluded. Then at procedure 318, a difference between the value of 1 and the sub-selection value for the pixel of interest with respect to the $k^{th}$ convex hull or open convex hull to be excluded t is calculated, and the calculated difference (i.e., (1−t)) is considered the selection value t for the pixel of interest with respect to the $k^{th}$ convex hull or open convex hull to be excluded. The calculated difference is the inverse of the sub-selection value for the pixel of interest with respect to the $k^{th}$ convex hull or open convex hull to be excluded.

At procedure 320, the method 300 is configured to determine whether the selection value for the pixel of interest with respect to the $k^{th}$ convex hull or open convex hull to be excluded t is less than the selection value for the pixel of interest with respect to the base convex hull σ. If it is determined that the selection value for the pixel of interest with respect to the $k^{th}$ convex hull or open convex hull to be excluded t is less than the selection value for the pixel of interest with respect to the base convex hull σ, the method 300 proceeds to procedure 324. If not, the method 300 proceeds to procedure 322 where the method 300 increments the counter. In one embodiment, the counter is incremented by a value of 1. The method 300 from procedure 322 returns to procedure 308.

At procedure 324, the selection value for the pixel of interest with respect to the $k^{th}$ convex hull or open convex hull to be excluded t is considered the selection value for the pixel of interest with respect to the base convex hull σ. The method 300 from procedure 324 proceeds to procedure 322, where the method 300 increments the counter.

At procedure 312, the selection value for the pixel of interest with respect to the base convex hull σ is considered the selection value for the pixel of interest with respect to the concave hull, and the method 300 ends at procedure 314.

Figure 4:
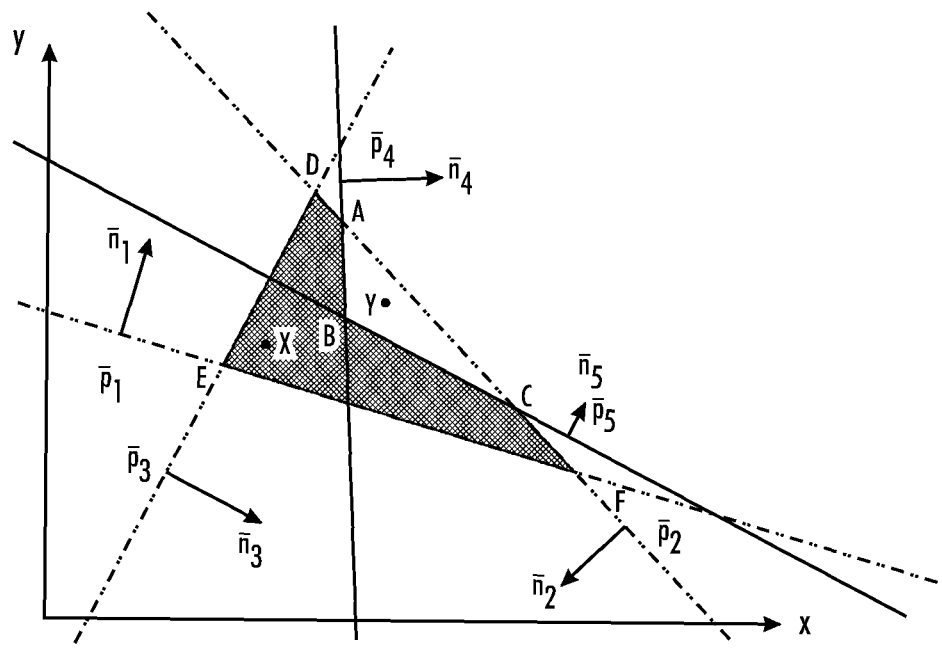
FIG. 4 shows a system for adjusting the color of an image according to an embodiment of the present disclosure.

FIG. 4 shows a graphical representation showing an example of selecting a convex space according to an embodiment of the present disclosure. The graph illustrates the horizontal components or x-components of the vector pairs $\vec{p}_i$ and $\vec{n}_i$ on a horizontal x-axis. On a vertical y-axis, the graph illustrates the vertical components or y-components of the vector pairs $\vec{p}_i$ and $\vec{n}_i$.

The convex space that is selected is represented as a light gray fill region in the graph. The base convex hull is selected using three vector pairs of $\vec{p}_i$ and $\vec{n}_i$, $i \in \{1, 2, 3\}$. The open convex hull is defined by two vector pairs of $\vec{p}_i$ and $\vec{n}_i$, $i \in \{4, 5\}$. The open convex hull (defined by two vector pairs of $\vec{p}_i$ and $\vec{n}_i$, $i \in \{4, 5\}$) is excluded from the base convex hull (i.e., selected using three vector pairs of $\vec{p}_i$ and $\vec{n}_i$ $i \in \{1, 2, 3\}$) to select the desired convex space.

Referring to FIG. 4, pixels X and Y represent two pixels that lie within a portion of the color space (i.e., represented by a triangular portion DEF) which corresponds to the base convex hull. The pixel X represents the pixel that lies within a portion of the color space (i.e., represented as a light gray fill region) that is selected. The pixel Y represents the pixel that lies within a portion of the color space (i.e., represented by a white color filled triangular portion ABC) that is not selected.

For example, the pixel X lies within a blue color portion of the color space (i.e., assuming that the selected color, as dictated by the natural language input, is blue), while the pixel Y lies within a different color (other than blue, for example) portion of the color space or a portion of the color space that corresponds to a combination of blue and a different color (other than blue, for example).

Figure 5:
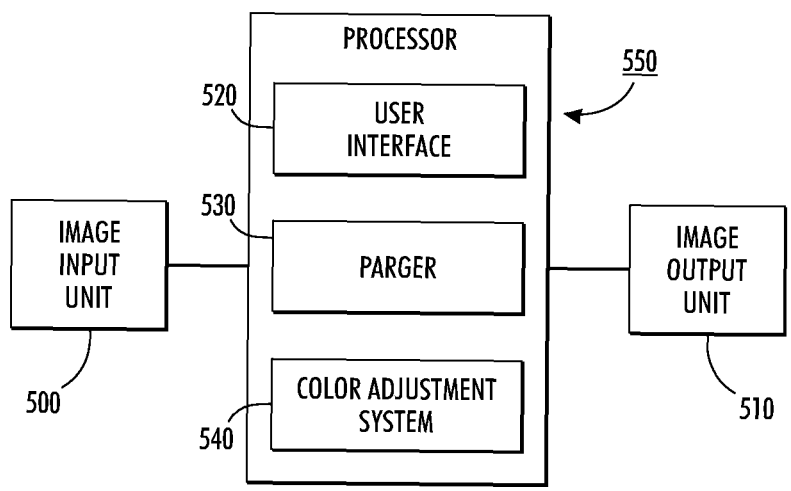
FIG. 5 is a graphical representation showing an example of selecting a convex space according to an embodiment of the present disclosure.

FIG. 5 schematically illustrates an exemplary system that may be used for accomplishing the methods shown and described in FIGS. 1-3. It is important to note that many or all of these components may be part of the same device. All actions taken by the components described herein may be performed using a common processor or array of processors. An image input unit 500 would be the source of data corresponding to a document. The image input unit 500 could be, for example, a color scanner, a personal computer, or workstation with appropriate document or image creation software, a camera or a data storage device, or internet linked electronic storage. The system may include an image viewing unit that produces a image that a user may review. The user, after reviewing the image, may then communicate a natural language request or requests through a user interface 520. The system may optionally include a parser 530 for parsing natural language requests entered by the user. The user interface 520, the parser 530, and the color adjusting system 540 may all be located on a processor 550. The processor 550 may also control the image input unit 500 and the image output unit 510.

The color adjusting system 540 is configured a) to receive a natural language command from the user interface (or the parser 530) to adjust a selected color of at least a portion of the image; b) to determine a selection value for a pixel of interest in the image by comparing a location of a color of the pixel of interest within a color space to a plurality of planes defining a multi-dimensional boundary of a portion of the color space corresponding to the selected color, the selection value being representative of whether the pixel of interest lies within the portion of the color space corresponding to the selected color; and c) to adjust the selected color of at least the portion of the image based on the natural language command.

After the color adjusting system 540 adjusts the selected color of at least the portion of the image based on the natural language command, the image output unit 510 may produce a new image with the selected color of at least the portion of the image being adjusted. The image output unit 510 may send the image to an appropriate output device, e.g., a display screen, an image printing system, or a facsimile machine. The output image may, for example, be present on a display or a hardcopy output from the image printing system.

The system 500 disclosed herein may include dedicated hardware like ASICs or FPGAs, software (firmware), or a combination of dedicated hardware and software. For the different applications of the embodiments disclosed herein, the programming and/or configuration may vary. In addition, the systems and methods for adjusting the color of an image may be software, for example, applications having computer or machine-executable information, created using any number of programming languages (e.g., Ada, C++, Java, etc.). Of course, it will be appreciated that any number of hardware implementations, programming languages, and operating platforms may be used. As such, the description or recitation of any specific hardware implementation, programming language, and operating platform herein is exemplary only and should not be viewed as limiting. Alternatively, or additionally, the application may be a stand-alone application running on a computer which interfaces with a printing system, for example, through a remote network connection, or via a computer-readable storage media. In one embodiment, the applications may be a "plug-in" application that is incorporated into a third-party software application including, for example, document-processing or image production applications. Other configurations may be also implemented.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for adjusting a color of an image, the image comprising a plurality of pixels, the method being implemented in a computer system comprising one or more processors configured to execute one or more computer program modules, the method comprising:
   receiving a natural language command to adjust a selected color of at least a portion of the image;
   determining a selection value for a pixel of interest in the image by comparing a location of a color of the pixel of interest within a color space to a plurality of planes defining a multi-dimensional boundary of a portion of the color space corresponding to the selected color, the selection value being representative of whether the pixel of interest lies within the portion of the color space corresponding to the selected color; and adjusting, based on the natural language command, the selected color of the pixel or the pixels of at least the portion of the image determined to be within the portion of the color space corresponding to the selected color, wherein determining the selection value for the pixel of interest in the image comprises:

determining a sub-selection value for the pixel of interest with respect to each plane in the color space;

determining a minimum value of the sub-selection values; and assigning the determined minimum value as the selection value for the pixel of interest.

2. The method according to claim 1, wherein each plane comprises at least a boundary vector for specifying a point through which boundary of the plane passes, and a normal vector for specifying a direction orthogonal to the boundary of the plane.

3. The method according to claim 2, wherein the sub-selection value the pixel of interest with respect to each plane is determined by computing a dot product of a difference between a pixel of interest and the boundary vector, and the normal vector.

4. A method for adjusting a color of an image, the image comprising a plurality of pixels, the method being implemented in a computer system comprising one or more processors configured to execute one or more computer program modules, the method comprising:

receiving a natural language command to adjust a selected color of at least a portion of the image;

determining a selection value for a pixel of interest in the image by comparing a location of a color of the pixel of interest within a color space to a plurality of planes defining a multi-dimensional boundary of a portion of the color space corresponding to the selected color, the selection value being representative of whether the pixel of interest lies within the portion of the color space corresponding to the selected color; and adjusting, based on the natural language command, the selected color of the pixel or the pixels of at least the portion of the image determined to be within the portion of the color space corresponding to the selected color, wherein determining the selection value for the pixel of interest in the image comprises:

determining a sub-selection value for the pixel of interest with respect to each plane in the color space;

determining a minimum value of the sub-selection values and the value of 1;

determining a maximum value of the determined minimum value and the value of 0; and assigning the determined maximum value as the selection value for the pixel of interest.

5. A method for adjusting a color of an image, the image comprising a plurality of pixels, the method being implemented in a computer system comprising one or more processors configured to execute one or more computer program modules, the method comprising:

receiving a natural language command to adjust a selected color of at least a portion of the image;

determining a selection value for a pixel of interest in the image by comparing a location of a color of the pixel of interest within a color space to a plurality of planes defining a multi-dimensional boundary of a portion of the color space corresponding to the selected color, the selection value being representative of whether the pixel of interest lies within the portion of the color space corresponding to the selected color; and adjusting, based on the natural language command, the selected color of the pixel or the pixels of at least the portion of the image determined to be within the portion of the color space corresponding to the selected color, wherein the multi-dimensional boundary of the portion of the color space includes one or more concave hulls, and wherein determining the selection value for the pixel of interest in the image comprises:

providing a base convex hull and one or more planes or hulls forming a convex hull with the concave hulls to define excluded convex hulls to be excluded from the base convex hull;

determining a base selection value for the pixel of interest with respect to the base convex hull;

determining a sub-selection value for the pixel of interest with respect to each excluded convex hull to be excluded; determining a difference, for each excluded convex hull to be excluded, between the value of 1 and the sub-selection value;

determining a minimum value of the base selection value for the pixel of interest with respect to the base convex hull, and the determined differences; and assigning the determined minimum value as the selection value for the pixel of interest.

6. A system for adjusting a color of an image, the image comprising a plurality of pixels, the system comprising:

a user interface; and a processor configured a) to receive a natural language command from the user interface to adjust a selected color of at least a portion of the image;

b) to determine a selection value for a pixel of interest in the image by comparing a location of a color of the pixel of interest within a color space to a plurality of planes defining a multi-dimensional boundary of a portion of the color space corresponding to the selected color, the selection value being representative of whether the pixel of interest lies within the portion of the color space corresponding to the selected color; and c) to adjust, based on the natural language command, the selected color of the pixel or pixels of at least the portion of the image determined to be within the portion of the color space corresponding to the selected color, wherein the processor is further configured:

a) to determine a sub-selection value for the pixel of interest with respect to each plane in the color space;

b) to determine a minimum value of the sub-selection values; and c) to assign the determined minimum value as the selection value for the pixel of interest.

7. The system according to claim 6, wherein each plane comprises at least a boundary vector for specifying a point through which boundary of the plane passes, and a normal vector for specifying a direction orthogonal to the boundary of the plane.

8. The system according to claim 7, wherein the sub-selection value for the pixel of interest with respect to each plane is determined by computing a dot product of a difference between a pixel of interest and the boundary vector, and the normal vector.

9. A system for adjusting a color of an image, the image comprising a plurality of pixels, the system comprising:

a user interface; and a processor configured a) to receive a natural language command from the user interface to adjust a selected color of at least a portion of the image;

b) to determine a selection value for a pixel of interest in the image by comparing a location of a color of the pixel of interest within a color space to a plurality of planes defining a multi-dimensional boundary of a portion of the color space corresponding to the selected color, the selection value being representative of whether the pixel of interest lies within the portion of the color space corresponding to the selected color; and c) to adjust, based on the natural language command, the selected color of the pixel or pixels of at least the portion of the image determined to be within the portion of the color space corresponding to the selected color, wherein the processor is further configured:

a) to determine a sub-selection value for the pixel of interest with respect to each plane in the color, space;

b) to determine a minimum value of the sub-selection values and the value of 1;

c) to determine a maximum value of the determined minimum value and the value of 0; and d) to assign the determined maximum value as the selection value for the pixel of interest.

10. A system for adjusting a color of an image, the image comprising a plurality of pixels, the system comprising:

a user interface; and a processor configured a) to receive a natural language command from the user interface to adjust a selected color of at least a portion of the image;

b) to determine a selection value for a pixel of interest in the image by comparing a location of a color of the pixel of interest within a color space to a plurality of planes defining a multi-dimensional boundary of a portion of the color space corresponding to the selected color, the selection value being representative of whether the pixel of interest lies within the portion of the color space corresponding to the selected color; and c) to adjust, based on the natural language command, the selected color of the pixel or pixels of at least the portion of the image determined to be within the portion of the color space corresponding to the selected color, wherein the multi-dimensional boundary of the portion of the color space includes one or more concave hulls, and wherein the processor is further configured:

a) to provide a base convex hull and one or more planes or hulls forming a convex hull with the concave hulls to define excluded convex hulls to be excluded from the base convex hull;

b) to determine a base selection value for the pixel of interest with respect to the base convex hull;

c) to determine a sub-selection value for the pixel of interest with respect to each excluded convex hull to be excluded;

d) to determine, for each excluded convex hull to be excluded, a difference between the value of 1 and the sub-selection value;

e) to determine a minimum value of the base selection value for the pixel of interest with respect to the base convex hull, and the determined differences; and f) to assign the determined minimum value as the selection value for the pixel of interest.

\* \* \* \* \*